United States Patent [19]

Kammerl

[11] Patent Number: 5,097,466
[45] Date of Patent: Mar. 17, 1992

[54] METHOD AND CIRCUITRY FOR TRANSMISSION OF COMMUNICATIONS SIGNALS IN A BROAD-BAND COMMUNICATIONS NETWORK

[75] Inventor: Anton Kammerl, Groebenzell, Fed. Rep. of Germany

[73] Assignee: Siemens Aktiengesellschaft, Berlin and Munich, Fed. Rep. of Germany

[21] Appl. No.: 403,547

[22] Filed: Sep. 5, 1989

[30] Foreign Application Priority Data

Sep. 23, 1988 [EP] European Pat. Off. ........ 88115725.9

[51] Int. Cl.⁵ .............................................. H04J 3/24
[52] U.S. Cl. ..................................... 370/94.1; 370/60
[58] Field of Search ................... 370/58.1, 58.2, 58.3, 370/60, 60.1, 94.1, 94.2, 94.3, 110.1

[56] References Cited

U.S. PATENT DOCUMENTS 4,556,972 12/1985 Chan et al. .............................. 370/60
4,782,485 11/1988 Gollub .................................... 370/60
4,862,451 8/1989 Closs et al. ............................ 370/60

OTHER PUBLICATIONS

"Broadband ISDN Switching Capabilities from a Services Perspective" by Dan R. Spears; IEEE Journal on Selected Areas in Communications, vol. SAC-5, No. 8, Oct. 1987, New York, N.Y.; pp. 1222-1230.
"High Speed Packet Switching Network for Multi--Media Information" by S. Nojima et al.; Computer Networking Symposium (IEEE, New York); Nov. 17-18, 1986, Washington, D.C.; pp. 141-150.
"Die Vermittlungstechnik in integrierten Paketuebermittlungssystemen (Teil 1)", von W. Schmidt; 41. Jahrang, Heft 9, Sep. 1987; pp. 1-9.

Primary Examiner—Douglas W. Olms
Assistant Examiner—Wellington Chin
Attorney, Agent, or Firm—Jeffrey P. Morris

[57] ABSTRACT

A broad-band communications network having at least one packet switching network, wherein the transmission of communications signals occurs in packets of a fixed length. Packing/depacking units are provided at the network interfaces to form and break up the packets. After trunking, the degree of packet filling of the packets provided for communications signal transmission is adjusted on the basis of the trunking information transmitted and on an individual connection basis in a packet switching system associated with the packet switching network. Information regarding the control signal containing the adjusted degree of packet filling is transmitted to all packing/depacking units involved in the connection to be established to set the packing-/depacking units accordingly.

6 Claims, 2 Drawing Sheets

METHOD AND CIRCUITRY FOR TRANSMISSION OF COMMUNICATIONS SIGNALS IN A BROAD-BAND COMMUNICATIONS NETWORK

CROSS REFERENCE TO RELATED APPLICATION

Anton Kammerl, Ser. No. 07/403,528, filed Sept. 5, 1989, Method and Circuitry for Transmission of Speech Signals In A Broad-Band Communications Network.

BACKGROUND OF THE INVENTION

1. Field of the Invention

The present invention relates to a method and circuitry for transmission of communication signals in a broad-band communications network.

2. Description of the Prior Art

There is known in the prior art a broad-band communications network (Der Fernmelde-Ingenieur, Vol. 41, Sept., 1987, No. 9, "Exchange Technique in Packet Transmission Systems," pp. 2-8) in which signals of different services according to an ATD (asynchronous time division) method, i.e., are transmitted in packets. The broad-band communications network has packing-/depacking devices for forming packets and breaking up packets at the network interfaces.

In broad-band communications networks, wherein packets of a fixed length are transmitted, there is a lag in transmission of communications signals due to the required packing/depacking times as well as the processing and waiting times in the exchange equipment which can has negative effects on the quality of speech signal transmissions. Thus if the lag time is too long, this can result in undesirably long speech pauses which interfere with the speech flow. Furthermore, additional problems can occur in a transfer in broad-band communications networks to which switching networks also belong in addition to packet switching network to which the subscriber units are connected by hybrid sets. Such problems are that the transit times of echo signals caused by the hybrid set assume such an order of magnitude due to the aforementioned lag times in the packet switching network that the echo signals are perceived as interference by the telephone subscribers.

Such echo signals can now be suppressed by means of echo suppressors or echo compensators connected to the transmission lines. However, this requires a certain circuitry expense which is undesirable in some cases. In addition, in order to reduce the lag times in broad-band packet switching networks, there have already been proposals whereby packets of a fixed length are occupied only in part by speech signals in speech signal transmissions.

The problem which the present invention solves is to provide a method and apparatus whereby the lag times due to the packet switching network are reduced in the transmission of communications signals taking place at least partially in a packet switching network.

SUMMARY OF THE INVENTION

The aforementioned problem is solved in a method according to the invention, wherein the advantage that the degree of packet filling for communications signal packets and thus the lag time due to packing and depacking in the packet switching network can be adjusted on an individual connection basis by means of the trunking scheme information transmitted in the wake of a switching operation is provided. Thus, it is possible to reduce the degree of packet filling of communications signal packets for trunk connections on the basis of received trunking scheme information, whereas for connections in the direct service area, e.g., for local connections, the full packet capacity is utilized. Thus the operation of the packing/depacking equipment can be adjusted to an optimum effective bit rate on an individual connection basis.

A small additional control expense in a packet switching system and in the packing/depacking equipment is necessary when the control signal is transmitted from the respective packet switching system to the packing-/depacking equipment in packets that serve a trunking (connection establishment) purpose in response to a call packet in the direction of the packets to be delivered to the subscriber systems participating in the respective connection. By inserting control signals as additional information into packets transmitted during the trunking of connections anyway, no changes are necessary in the existing signaling procedures.

In addition, it is expedient that communications signal packets are completely filled with communications signals or communications signal packets are completely broken up by the packing/depacking equipment in the basic setting and only on occurrence of a control signal is there a reduction in the degree of packet filling for the communications signal packets or the breakup of communications signal packets is reduced in accordance with the adjusted degree of packet filling. In this way the control expense for transmission of control signals and their analysis is reduced.

The method according to the present invention is advantageously used in a broad-band communications network which includes at least one packet switching network and a telephone switching network with at least one telephone exchange to which telephone subscriber units are connected by hybrid sets in order to fix the degree of packet filling on an individual connection basis for the speech signal packets to be transmitted in the wake of dial connections in the packet switching network. Thus, the use of the aforementioned echo handling equipment can be greatly reduced or even eliminated entirely.

Another advantage of the invention is the minimal additional circuit expense for adjusting the degree of packet filling for communications signal packets in packet switching systems and in the packing/depacking units included in the communications signal connections.

The present invention will be explained in greater detail with reference to the accompanying figures; and to a description of a preferred embodiment, wherein:

DESCRIPTION OF THE PREFERRED EMBODIMENT

Figure 1:
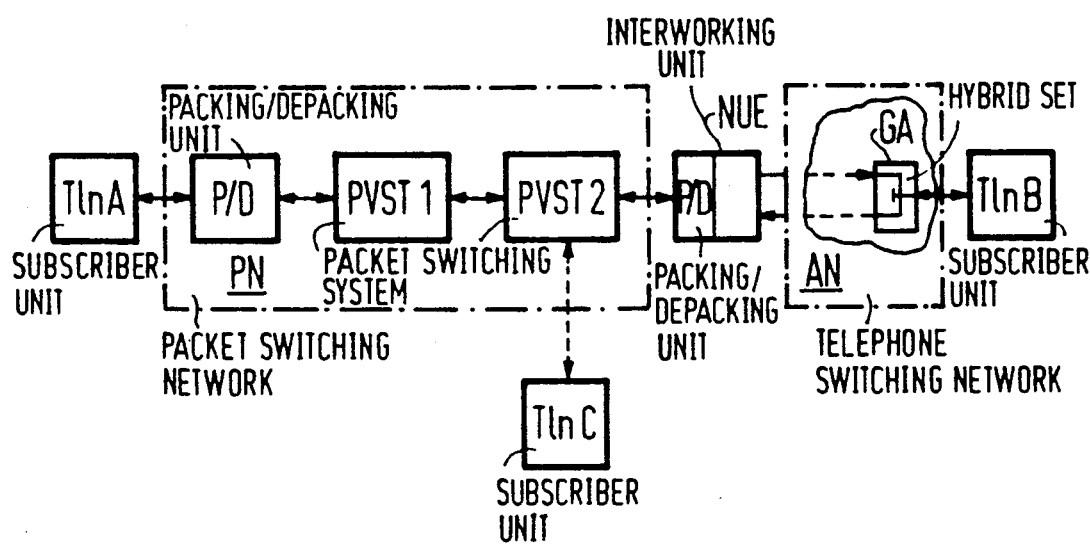
FIG. 1 shows a schematic diagram of a broad-band communications network in accordance with the present invention.

The broad-band communications network illustrated in FIG. 1 may consist, for example, of a broad-band packet switching network PN and a switching network AN for connection of analog telephone subscriber units. The packet switching network PN consists of a number of interconnected packet switching systems only two of which are shown here as PVST1 and PVST2. Each of these packet switching systems has a number of connecting lines which can be used either as subscriber's lines or as interoffice trunks. For simplification of FIG. 1, however, only two such connecting lines are shown per packet switching system.

Within the broad-band packet switching network, signals of different services are transmitted in packets of a fixed length according to an ATM process (asynchronous transfer mode). The information field of each of the packets can be set, for example, at 32 octets. The transmission rate on the connecting lines is, for example 140 Mbits/second. To create dial connections, signaling procedures that correspond to the D channel protocol fixed according to ISDN (integrated services digital network) recommendations in the case of subscriber's lines or they correspond to central channel signaling system No. 7 for interoffice trunks, depending on whether the connecting lines are subscriber's lines or interoffice trunks.

Packing/depacking equipment is provided at the interface of the packet switching network with the subscriber equipment which may be ISDN subscriber's equipment. This packing/depacking equipment is provided in order to insert the signals sent by the subscriber's equipment in packets of a fixed length or to break up packets transmitted by the packet switching network so the signals can be relayed to the subscriber's sets. One of these packing/depacking units P/D as well as a subscriber's set TlnA connected to it are diagrammed in FIG. 1. The packing/depacking equipment can also be located inside the subscriber's equipment.

For a network transition between the packet switching network PN and the aforementioned switching network AN, a network transfer unit NUE (interworking unit) is provided and has access to a number of connecting lines (not shown in FIG. 1). This unit carries out all the signal and procedure conversions that are necessary for network transfer. There is at least one packing/depacking unit P/D in the direction of the packet switching network. The switching network AN may be a traditional switching network to which analog subscriber systems can be connected by hybrid sets GA. FIG. 1 shows schematically one such hybrid set as well as a subscriber's unit TlnB connected thereto.

The method according to the present invention will be described in detail. It is first assumed that a connection from the subscriber's unit TlnA of the packet switching network PN is to be established with the subscriber's unit TlnB of the switching network AN for the purpose of speech signal transmission.

To initiate trunking, selection information is delivered in a known manner by the subscriber's unit TlnA, where the selection information designates the subscriber's unit selected for the connection, namely in this case the subscriber's unit TlnB. This selection information is inserted into a so-called call packet with the help of the packing/depacking unit P/D and is then sent to the packet switching system PVST1, where alternative routing is then performed in a known way on the basis of the selection information. In addition, the degree of packet filling is adjusted on the basis of the selection information for the speech signal packets to be transmitted after trunking. For example, one possible procedure is to use the entire capacity available within a packet for speech signal transmission for conversations in the direct service area, e.g., for local conversations. In this direct service area, it can be assumed that lag times occur in transmission of speech signal packets within the packet switching network and that these lag times do not have any negative effect on the above-mentioned echo transit times.

With desired trunk connections which are characterized, e.g., by fixed preselection codes contained in the selection information, however, the echo signal transit times can be increased by the lag times within the packet switching network to such an extent that the echo signals are perceived as interference during a conversation by the persons participating in the conversation. Since the lag times within the packet switching network are largely caused by the packing and depacking times for the speech signal packets, there is a provision for the trunk connections to have a reduced degree of packet filling set for the individual speech signal packets by that packet switching system currently receiving a call packet, namely the packet switching system PVST1 in this case. The procedure followed here is that either a uniform reduced degree of packet tilling, e.g., $\frac{1}{2}$ of the given packet length (16 octets with a packet length of 32 octets), is set for all trunk connections to be established or a reduced degree of packet filling (e.g., $\frac{1}{2}$, $\frac{1}{4}$, ...) which is graded according to the length of the trunk connections to be established is adjusted by analyzing the selection information.

Data regarding an adjusted degree of packet filling are transmitted from the packet switching system PVST1 in the form of a control signal to the packing-/depacking equipment (P/D, NUE in FIG. 1) that is involved in the connection to be established at that moment. Such a control signal can be inserted into packets that are to be transmitted following the trunking in accordance with the established signaling procedure in the direction of the subscriber's sets that are to be involved in the connection, here namely the subscriber's sets TlnA and TlnB. Following reception of a control signal, an adjustment is performed in the packing/depacking equipment to such an extent that the packets are filled up with speech signals in accordance with the adjusted degree of packet filling or they are broken up for transmission following trunking.

With the desired trunking from the subscriber's unit TlnB to the subscriber's unit TlnA, in principle the process steps described here result in the corresponding process steps. In this case, the selection information output by the subscriber's unit TlnB is relayed by way of the interworking unit NUE in the form of a call packet to the packet switching station PVST2, which sets the degree of packet filling for the speech signal packets to be transmitted within the packet switching network PN in the manner indicated above, and a corresponding control signal is sent to the packing/depacking units that are involved in the connection.

On the basis of the selection information a distinction can be made between local connections and trunk connections. For trunk connections, a uniform reduction in degree of packet filling can be performed as an alternative or the reduction in the degree of packet filling of speech signal packets can be graded according to the selection information received and thus according to the length of the trunk connections. If the telephone exchange AN is designed so that identification of the origin area is also transmitted in addition to adjusted either on the basis of this identification alone or in combination with the selection information.

Figure 2:
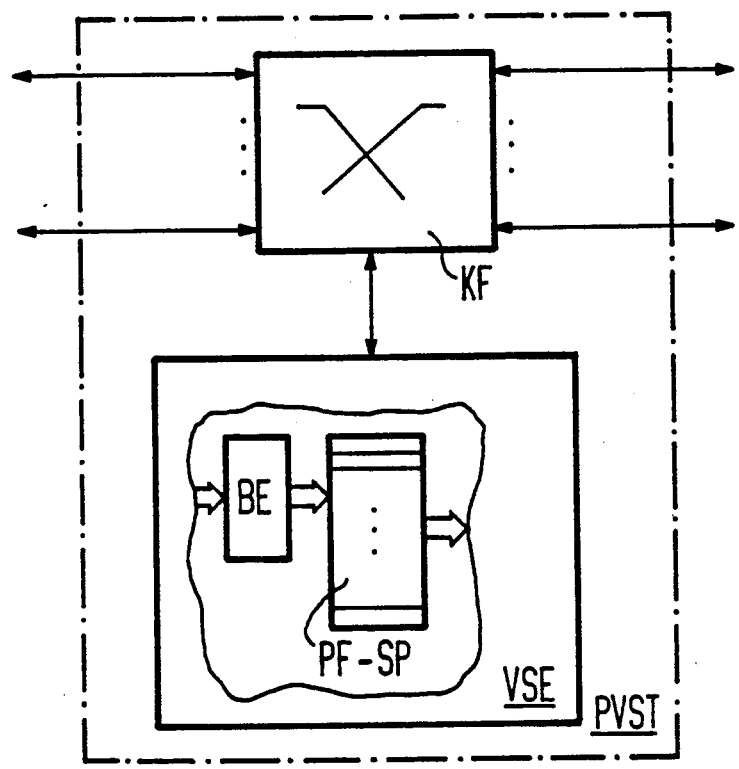
FIG. 2 shows a block schematic of a packet switching system in accordance with the present invention.

FIG. 2 shows a schematic diagram of a packet switching system labeled as PVST. Its design and switching principle have already been described so in this system only a coupling field KF as well as a switching control unit VSE are indicated. The additional equipment provided for carrying out the process described above is indicated for the switching control unit. This additional equipment includes an evaluation unit BE that receives the selection information from the packet switching system in a call packet and optionally also receives the identification of the origin area. This information is analyzed by logic circuits, e.g., in the form of comparator arrangements with regard to the presence of codes indicating a trunk connection. Depending on the results of this analysis, the corresponding output signals appear at the output of the evaluation unit. Due to such output signals, it is also possible to differentiate between individual trunk connections and trunk connection groups.

The output signals of the evaluation unit BE are sent as address signals to a memory for the degree of packet filling PF-SP. This packet filling memory, which may be, for example, a read-only memory a read-write memory, has a number of storage cells in fixed assignment with the address signals where information regarding a adjusted degree of packet filling is stored. Each time address signals are supplied, the memory cell assigned to them is selected for delivery of the data stored in it. Then on the basis of these data, the switching control unit VSE generates a control signal as mentioned hereinbefore for setting the aforementioned packing-/depacking units P/D.

The control signals to be transferred to the packing-/depacking units can also be stored directly in the memory cells of the packet filling memory PF-SP as information with regard to the adjusted degree of packet filling. Thus the switching control unit VSE is relieved of the burden of generating control signals.

Figure 3:
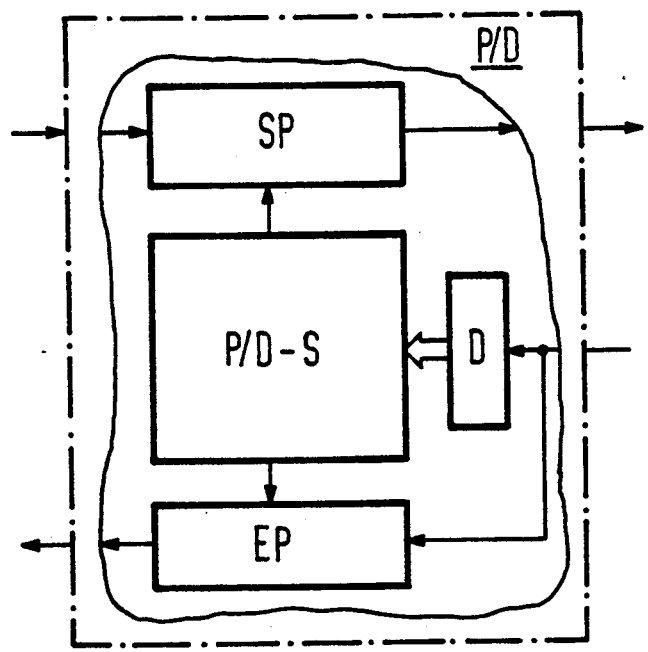
FIG. 3 shows a block schematic of a packing/depacking system in accordance with the present invention.

FIG. 3 shows schematically a packing/depacking unit P/D. Since its design as well as its operation have already been described, FIG. 3 shows only a transmitter buffer SP for forming packets of a fixed length to be transmitted within the packet switching network PN, a receiving buffer EP for breaking up packets received via the packet switching network as well as a packing-/depacking control unit P/D-S. In addition to the aforementioned systems, a discriminator D is also provided to monitor the occurrence of a control signal transmitted from the packet switching system during trunking. As already mentioned, a control signal can be transmitted, for example, in a packet which is to be transmitted following trunking via the packet switching systems in the direction of the subscriber's units participating in the connection to be established.

On recognition of a control signal, discriminator D delivers adjusting signals to the packing/depacking control unit P/D-S, optionally after recoding. With the help of these adjusting signals, the transmission buffer SP and the reception buffer EP are adjusted via the packing/depacking control unit. To do so, counting circuits that are usually present in a packing/depacking unit and serve to control said buffers are preset such that the transmission buffer SP inserts a number of speech signals that corresponds to the degree of packet filling set by the packet switching system into a speech signal packet to be transmitted and the reception buffer EP breaks up the received speech signal packets in accordance with the set degree of packet filling.

Presetting of the aforementioned counting circuits can also take place in such a way that in the basic setting, the speech signal packets are either completely filled with speech signals or the speech signal packets are completely broken up. Only in response to the occurrence of a control signal is the presetting of the counting circuits modified in order to adjust the transmission buffer SP and the reception buffer EP to a reduced degree of packet filling in accordance with the received control signal.

The method according to this invention has been described herein in connection with an example of speech signal transmission in a broad-band communications network which includes a broad-band packet switching network and switching network for connection of analog subscriber's units. Use of this method is not limited to such broad-band communications networks, however, but in general it can also be used in broad-band communications networks which include at least one broad-band packet switching network and wherein the lag times are to be reduced for communications signal transmission. One such example is a broad-band communications network that consists only of a broad-band packet switching network in which speech signals, etc., are to be transmitted between two subscriber's units, e.g., between the subscriber's unit TlnA in FIG. 1 and a subscriber's unit (TlnC) connected to the packet switching system PVST2 by way of a packing/depacking unit (not shown here). In addition, in a broad-band communications network with at least one packet switching network, the process according to this invention can also be used for transmission of communications signals of other services, e.g., transmission of data signals and video signals, if short lag times are needed for this transmission. In this case, for example, such a rapid transmission can be called for by a request signal that is transmitted automatically or as needed from one subscriber's unit together with the selection information following trunking. Occurrence of this request signal is monitored in the above-mentioned evaluation unit BE. Such a request signal can also be delivered as needed in a speech signal transmission, e.g., by operation of a special key on one of the subscriber's units.

I claim:

1. A method for transmission of communication signals following dial connections between subscriber units of a broad-band communications network having at least one packet switching network in which the communication signals are transmitted in communication signal packets of a fixed length and the packet switching network has access to packing/depacking units for packing or depacking of communication signal packets at network interfaces, comprising the steps of:

selecting the degree of packet filling for the communication signals packets, which are to be transmitted after establishing of a dial connection, by a packet switching system of at least one packet switching network in accordance with connection establishing information contained in a call packet that provides for establishing said dial connection and is transmitted to said packet switching systems from one of said network interfaces;

while establishing said dial connection, providing a control signal containing information indicative of the degree of packet filling just selected;

transmitting said control signal to those of said packing/depacking units of the broad-band communications network which are associated with the dial connection being established; and after establishing said dial connection is completed, packing or depacking the communication signal packets by the packing/depacking units associated with said dial connection in accordance with said control signal previously received.

2. A method according to claim 1, including the additional step of:

transmitting the control signal from said packet switching system to the packing/depacking units involved in the dial connection to be established in packets for the purpose of establishing said dial connection and to be delivered in response to said call packet in the direction of the subscriber units associated with said dial connection to be established.

3. A method according to claim 1, including the further substep that:

communication signal packets are either packed completely with communication signals or said communication signal packets are depacked completely by the packing/depacking units in a basic state of said packing/depacking units, and the degree of packet filling for the communication signal packets or the depacking of communications signal packets is reduced in accordance with the selected degree of packet filling only in response to the occurrence of said control signal.

4. A method according to claim 1 including the further substep that:

the broad-band communications network includes at least said packet switching network and a telephone switching network with at least one telephone system to which telephone subscriber units are connected via hybrid sets, and wherein the degree of packet filling is selected for speech signal packets to correspond to said communication signal packets and is transmitted following dial connections in said packet switching system either in accordance with selection information transmitted or in accordance with identification of the origin transmitted on an individual dial connection basis.

5. In a broad-band communications network, a circuit comprising:

an analyzer unit to analyze connection establishing information transmitted in a call packet;

a memory unit connected to said analyzer unit and having a plurality of memory cells for storing information relating to established degrees of packet filling, said analyzer and memory unit being in a switching control unit that is associated with a packet switching system;

means for deriving address signals assigned to instantaneously present connection establishing information at the output of said analyzer unit, whereby said address signals select one of said memory cells of the memory unit to access the information stored therein;

means in the switching control unit for deriving control signals to be transmitted to packing/depacking units in accordance with information accessed from the memory unit; and discriminator means in each of said packing/depacking units for recognition of control signals to permit adjustment of said packing/depacking units with respect to one of said established degrees of packet filling by delivering a corresponding adjustment signal in response to reception of one of said control signals.

6. A circuit according to claim 5, wherein the control signals to be transmitted are stored directly in the memory cells of the memory unit as degree of packet filling data.

* * * * *